United States Patent
Chang et al.

(10) Patent No.: US 9,386,133 B2
(45) Date of Patent: Jul. 5, 2016

(54) VOICE CONTROL MODULE FOR MOBILE INSTRUMENTS

(71) Applicant: Honeywell International Inc., Morristown, NJ (US)

(72) Inventors: Harry M. Chang, Medina, MN (US); Mary C. Parks, San Francisco, CA (US)

(73) Assignee: Honeywell International Inc, Morris Plains, NJ (US)

( * ) Notice: Subject to any disclaimer, the term of this patent is extended or adjusted under 35 U.S.C. 154(b) by 89 days.

(21) Appl. No.: 14/451,782

(22) Filed: Aug. 5, 2014

(65) Prior Publication Data

US 2016/0044147 A1  Feb. 11, 2016

(51) Int. Cl.
| | |
|---|---|
| H04M 1/00 | (2006.01) |
| H04M 1/02 | (2006.01) |
| H04M 1/03 | (2006.01) |
| H04M 1/18 | (2006.01) |
| H04R 1/08 | (2006.01) |
| H04W 52/02 | (2009.01) |
| G08B 21/12 | (2006.01) |
| H04W 4/22 | (2009.01) |
| H04R 3/00 | (2006.01) |
| G08B 25/01 | (2006.01) |
| G08B 25/10 | (2006.01) |

(Continued)

(52) U.S. Cl.
CPC .............. *H04M 1/026* (2013.01); *G08B 21/12* (2013.01); *H04M 1/03* (2013.01); *H04M 1/18* (2013.01); *H04R 1/086* (2013.01); *H04R 3/007* (2013.01); *H04W 4/22* (2013.01); *H04W 52/0254* (2013.01); *G08B 25/01* (2013.01); *G08B 25/10* (2013.01); *H04M 1/72536* (2013.01); *H04M 2250/12* (2013.01); *H04R 2499/11* (2013.01); *H04W 84/12* (2013.01)

(58) Field of Classification Search
CPC ... H04W 4/22; H04W 52/02; H04W 52/0254; H04M 1/72522; H04M 1/72536; G08B 21/04; G08B 25/00; G08B 25/01; G08B 25/016; G08B 25/10
USPC ........ 455/41.1, 41.2, 41.3, 404.1, 575.8, 574, 455/348
See application file for complete search history.

(56) References Cited

U.S. PATENT DOCUMENTS

| | | | |
|---|---|---|---|
| 7,342,502 B2 * | 3/2008 | Harkins .................... | A42B 3/30 340/573.1 |
| 8,224,286 B2 * | 7/2012 | Sinivaara ............... | A62B 18/08 340/539.26 |

(Continued)

FOREIGN PATENT DOCUMENTS

| | | | | |
|---|---|---|---|---|
| JP | 5547862 B1 * | 7/2014 | .............. | H04M 1/02 |

OTHER PUBLICATIONS

European Application Serial No. 15178391.7, Extended European Search Report mailed Dec. 3, 2015, 9 pgs.

*Primary Examiner* — Duc M Nguyen
(74) *Attorney, Agent, or Firm* — Schwegman Lundberg & Woessner, P.A.

(57) ABSTRACT

A mobile device includes a pressure sensor, a light sensor, a microphone, and a microphone cover. The mobile device is configured to power on upon one or more of an activation of the pressure sensor and a decrease in the intensity of light sensed by the light sensor. The microphone cover is configured to retract and expose the microphone upon one or more of the activation of the pressure sensor and the decrease in the intensity of light sensed by the light sensor.

20 Claims, 1 Drawing Sheet

(51) Int. Cl.
*H04M 1/725* (2006.01)
*H04W 84/12* (2009.01)

(56) References Cited

U.S. PATENT DOCUMENTS

| | | | | |
|---|---|---|---|---|
| 8,245,706 B2* | 8/2012 | Namm | .................... | H04R 1/08 128/200.24 |
| 8,737,951 B2* | 5/2014 | Jones | .................... | G08B 13/196 340/539.11 |
| 9,182,903 B2* | 11/2015 | Lombardi | ............. | G06F 1/3206 |
| 2005/0096096 A1* | 5/2005 | Birli | ....................... | H04B 1/385 455/569.1 |
| 2006/0286933 A1* | 12/2006 | Harkins | ................... | A42B 3/30 455/41.2 |
| 2007/0283952 A1* | 12/2007 | Wilbur | .................... | A62B 7/04 128/201.19 |
| 2008/0035145 A1* | 2/2008 | Adams | ................... | A62B 18/08 128/204.18 |
| 2009/0174547 A1* | 7/2009 | Greene | ................... | A62B 99/00 340/539.13 |
| 2010/0026817 A1* | 2/2010 | Ryan | .................... | G06F 19/3418 348/207.11 |
| 2010/0151916 A1 | 6/2010 | Baek et al. | | |
| 2010/0322442 A1* | 12/2010 | Namm | ..................... | H04R 1/08 381/122 |
| 2011/0077056 A1* | 3/2011 | Park | .................. | H04W 52/0254 455/569.1 |
| 2012/0235963 A1* | 9/2012 | Oshinome | ................ | G09G 5/00 345/204 |
| 2013/0063554 A1* | 3/2013 | Green | ................... | H04N 5/2252 348/36 |
| 2014/0038544 A1* | 2/2014 | Jones | ................... | G08B 13/196 455/404.2 |
| 2014/0168117 A1 | 6/2014 | Kim et al. | | |
| 2014/0188638 A1 | 7/2014 | Jones et al. | | |
| 2014/0198439 A1 | 7/2014 | De Pietro et al. | | |
| 2015/0065090 A1* | 3/2015 | Yeh | ....................... | H04W 12/06 455/411 |
| 2015/0070179 A1* | 3/2015 | Wu | ..................... | G06F 11/3058 340/603 |

* cited by examiner

VOICE CONTROL MODULE FOR MOBILE INSTRUMENTS

TECHNICAL FIELD

The present disclosure relates to a voice control module for mobile instruments.

BACKGROUND

In a hazardous operating or working environment, a member of a crew can wear a special uniform. This special uniform often includes heavy-duty work gloves. While in this type of operating environment, members of the crew may have difficulty in using a mainstream consumer-oriented communication device such as a smartphone using finger-based touch technology. To activate/deactivate a voice capture function provided by a portable device and use their voice to report a situation to another person and/or a computer system from afar (using a wireless data communication link, e.g., WiFi or LTE), the crew members may have difficulty using a traditional on/off switch for speech input (because of the heavy duty work gloves). Alternatively, to have the voice controller turned "on" at all times to listen to the voice input from the user would unduly consume the battery power for the portal device or instrument. Furthermore, the traditional "air intake" opening on the device is subject to damage introduced by air-born particles from dangerous materials in such an environment. A hinge-based cover for the microphone opening would require the user to open it or close it using a separate mechanism, which could be difficult to operate with a hand wearing a heavy-duty glove.

DETAILED DESCRIPTION

Figure 1:
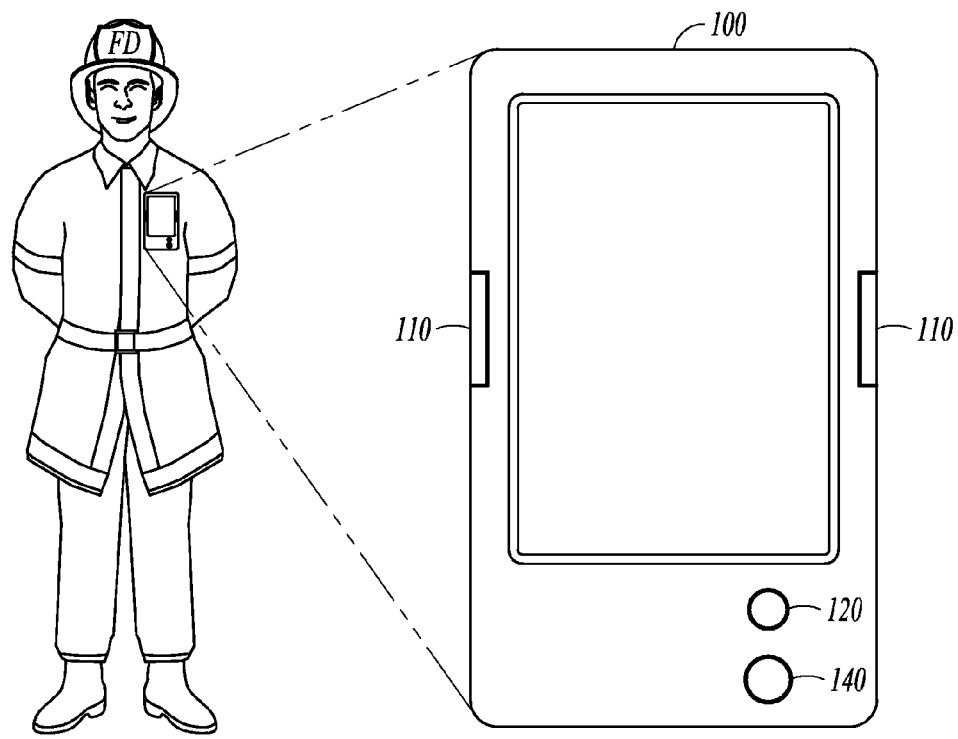
FIG. 1 is a plan view of a mobile communication device.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

An embodiment of the present disclosure addresses a problem of using mobile devices while wearing heavy duty protective gloves by turning on and/or off one or more microphone controllers in a mobile device intended to be operated in a hazardous environment.

An embodiment of a mobile device enables a user to turn on and/or off the microphone of the device via a simple and imprecise hand-grab motion, in conjunction with a decrease in the amount of light sensed by a light sensor on the device, so that the device can be activated and operated in a highly hazardous operating environment when the user is wearing heavy duty gloves. This turning on and/or off of the device is accomplished by utilizing advanced pressure-sensitive switches on the sides of the device, speed and motion when a person's hand is reaching for the device, and the intensity of the light being received from a light sensor when the hand is approaching the surface of the device (eventually covering the surface of the device and therefore blocking all the light receivable by the light sensor). For example, the speed and motion of a person's hand can be detected by the rate and direction of the decrease in light sensed by the light sensor.

The combination of these sensor technologies allows the device to start recording before the user speaks a first syllable to ensure that there is no voice truncation during the voice capturing process. The mobile device containing this type of voice controller has a wireless data communication capability. When a wireless connection is present, the device immediately streams the voice signals to a centralized monitoring system. If no wireless data connection is available at the time of the voice input, the voice signals are stored locally on the device for later transmission to the centralized monitoring system when a wireless data connection becomes available. A combination of visual and audible feedback is provided after each voice input. For stored, yet un-uploaded voice input files, the device can be configured to upload the previously stored voice input files to the centralized location on a periodic basis when the wireless data connection becomes available.

The voice control module can be used in a variety of mobile and/or wearable instruments in hazardous environments. A mobile and/or wearable gas detection device is one example to illustrate how the voice control module is used as part of a new gas detection device that allows the user to report the situation to a centralized location by speaking into the gas detection device through various sensors connected to the voice control module.

The sensors can include the following components. First, the sensors can include a directional microphone. Second, the sensors can include one or more pressure-sensitive switches to activate the audio recording when it is "grabbed" by a single hand. Third, the sensors can include a light sensor detector for use when the microphone switch is being grabbed since the hand begins to block the light during the grab process. Fourth, the sensors can include an air intake cover that is above the microphone membrane. The air intake cover is normally closed to protect the microphone in a hazardous environment. This cover is retracted to open the air intake area and let the speech wave into the opening when it is determined by the controller that the device has been grabbed by a human hand and the light sensor has been blocked by the hand at the same time. In an embodiment, the microphone cover includes two retractable cover blades that are opened to let the air intake flow to reach the microphone membrane below the cover by moving itself in opposite directions when the hand grab sensor detects motion.

Figure 2:
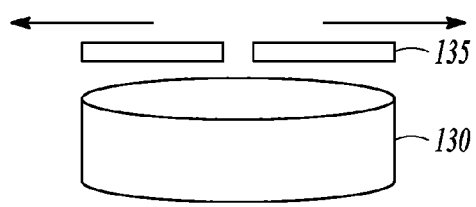
FIG. 2 is an illustration of an example embodiment of retractable cover plates for a microphone on a mobile communications device.
Figure 3:
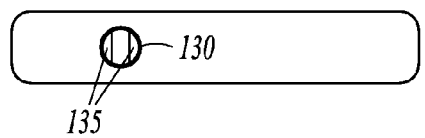
FIG. 3 is a top view of the mobile communications device of FIG. 1.

FIG. 1 is a plan view diagram of components of a mobile communication device system, FIG. 2 is an illustration of an example embodiment of retractable cover plates for a microphone on a mobile communications device, and FIG. 3 is a top view of FIG. 1. The system can include a mobile communication device 100. In an embodiment, the mobile communication device can be a smart phone. The mobile communication device can include pressure sensors 110. As illustrated in FIG. 1, the pressure sensors are located on opposite sides of the device, and are located at positions where a user is likely to grab the device. The mobile device 100 further can include a light sensor 120, which as indicated above, will sense a decrease in light when it is covered by a hand that is grasping the device. The mobile device 100 can also include a microphone 130, which can be covered by retractable plates 135. In an embodiment, as indicated in FIG. 3, the microphone is located on the top of the mobile communication device. FIG. 2 illustrates the direction of movement of the retractable plates 135 to expose the microphone 130. The mobile device 100 can further include a sensor 140 for detecting hazardous conditions such as harmful gases (e.g., carbon monoxide) and radiation. The mobile device can be attached to a person or a person's clothing via, for example, a strap, a belt, a clip, or Velcro.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A mobile communications device comprising:
   a pressure sensor;
   a light sensor;
   a microphone; and
   a microphone cover;
   wherein the mobile communications device is configured to power on upon one or more of an activation of the pressure sensor and a decrease in the intensity of light sensed by the light sensor; and
   wherein the microphone cover is configured to retract and expose the microphone upon one or more of the activation of the pressure sensor and the decrease in the intensity of light sensed by the light sensor.

2. The mobile communications device of claim 1, comprising a first pressure sensor and a second pressure sensor.

3. The mobile communications device of claim 2, wherein the first pressure sensor is located on a first side of the mobile communications device and the second pressure sensor is located on a second side of the mobile communications device.

4. The mobile communications device of claim 1, wherein the mobile communications device comprises a smart phone.

5. The mobile communications device of claim 1, comprising a sensor for detecting hazardous conditions including gases and radiation.

6. The mobile communications device of claim 1, wherein the power on of the mobile communications device comprises an activation of the microphone and an audio recording function of the microphone.

7. The mobile communications device of claim 1, wherein the microphone cover comprises one or more retractable plates.

8. The mobile communications device of claim 1, comprising a connector for attaching the mobile communications device to a person.

9. The mobile communications device of claim 1, comprising a memory for storing voice data of a user.

10. The mobile communications device of claim 9, comprising a processor to automatically upload the voice data to a centralized location when a wireless data connection becomes available.

11. A mobile sensor device comprising:
    a voice control processor;
    a pressure sensor;
    a light sensor;
    a microphone; and
    a microphone cover;
    wherein the voice control processor is configured to power on upon one or more of an activation of the pressure sensor and a decrease in the intensity of light sensed by the light sensor; and
    wherein the voice control processor is configured to retract and expose the microphone upon one or more of the activation of the pressure sensor and the decrease in the intensity of light sensed by the light sensor.

12. The mobile sensor device of claim 11, comprising a first pressure sensor and a second pressure sensor.

13. The mobile sensor device of claim 12, wherein the first pressure sensor is located on a first side of the mobile sensor device and the second pressure sensor is located on a second side of the mobile sensor device.

14. The mobile sensor device of claim 11, comprising a smart phone.

15. The mobile sensor device of claim 11, comprising a sensor for hazardous conditions including one or more of a gas sensor and a radiation sensor.

16. The mobile sensor device of claim 11, wherein the power on of the mobile sensor device comprises an activation of the microphone and an audio recording function of the microphone.

17. The mobile sensor device of claim 11, wherein the microphone cover comprises one or more retractable plates.

18. A mobile communications device comprising:
    a first pressure sensor;
    a second pressure sensor;
    a light sensor;
    a microphone; and
    a microphone cover;
    wherein the mobile communications device is configured to power on upon one or more of an activation of the pressure sensor and a decrease in the intensity of light sensed by the light sensor; and
    wherein the microphone cover is configured to retract and expose the microphone upon one or more of the activation of the pressure sensor and the decrease in the intensity of light sensed by the light sensor.

19. The mobile communications device of claim 18, wherein the first pressure sensor is located on a first side of the mobile communications device and the second pressure sensor is located on a second side of the mobile communications device.

20. The mobile communications device of claim 18, wherein the power on of the mobile communications device comprises an activation of the microphone and an audio recording function of the microphone.

* * * * *